(12) United States Patent  (10) Patent No.: US 6,591,067 B1
Oshima                    (45) Date of Patent:     Jul. 8, 2003

(54) FILM PRE-WINDING MECHANISM FOR 35 MM FILM FORMAT STILL CAMERAS

(75) Inventor: Shigeru Oshima, Tokyo (JP)

(73) Assignee: Arc Design, Inc., Tokyo (JP)

( * ) Notice: Subject to any disclaimer, the term of this patent is extended or adjusted under 35 U.S.C. 154(b) by 0 days.

(21) Appl. No.: 10/224,693

(22) Filed: Aug. 21, 2002

(51) Int. Cl.⁷ .............................. G03B 1/00; G03B 17/00
(52) U.S. Cl. ...................................... 396/407; 396/543
(58) Field of Search ................................ 396/403, 407, 396/408, 543

(56) References Cited

U.S. PATENT DOCUMENTS 4,251,148 A * 2/1981 Stemme et al. ............. 396/407
4,717,931 A * 1/1988 Himuro et al. ............. 396/407
6,021,282 A * 2/2000 Baxter et al. ............... 396/403

* cited by examiner

*Primary Examiner*—Christopher Mahoney
(74) *Attorney, Agent, or Firm*—Senniger, Powers, Leavitt & Roedel

(57) ABSTRACT

A mechanism to be used in 35 mm film format still cameras, which pre-winds a roll of unexposed film entirely by motor to the unexposed film chamber provided in the camera immediately after the camera back door has been closed with the unexposed film loaded inside without using any expensive electric circuits and devices like a CPU, and of which the pre-winding setting can be changed manually by hand to the winding setting (picture taking setting) for picture taking after the pre-winding has been completed, and which can be reset to the pre-winding setting of the mechanism automatically but mechanically when the camera back door is opened again after the film has been exposed, wound back into and stored in the film cartridge.

1 Claim, 12 Drawing Sheets

Fig.1-a

Fig.1-b
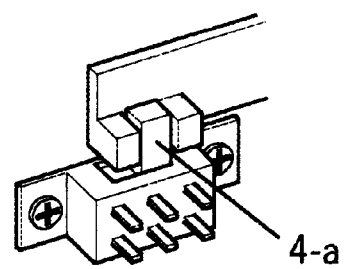
Fig.1-c
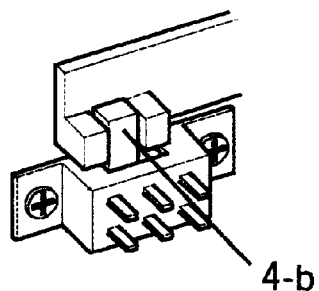
Fig.1-d
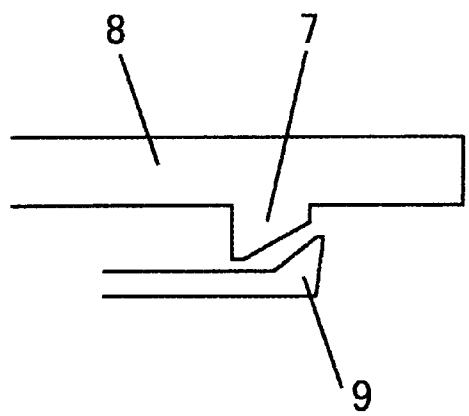

Fig.4-a
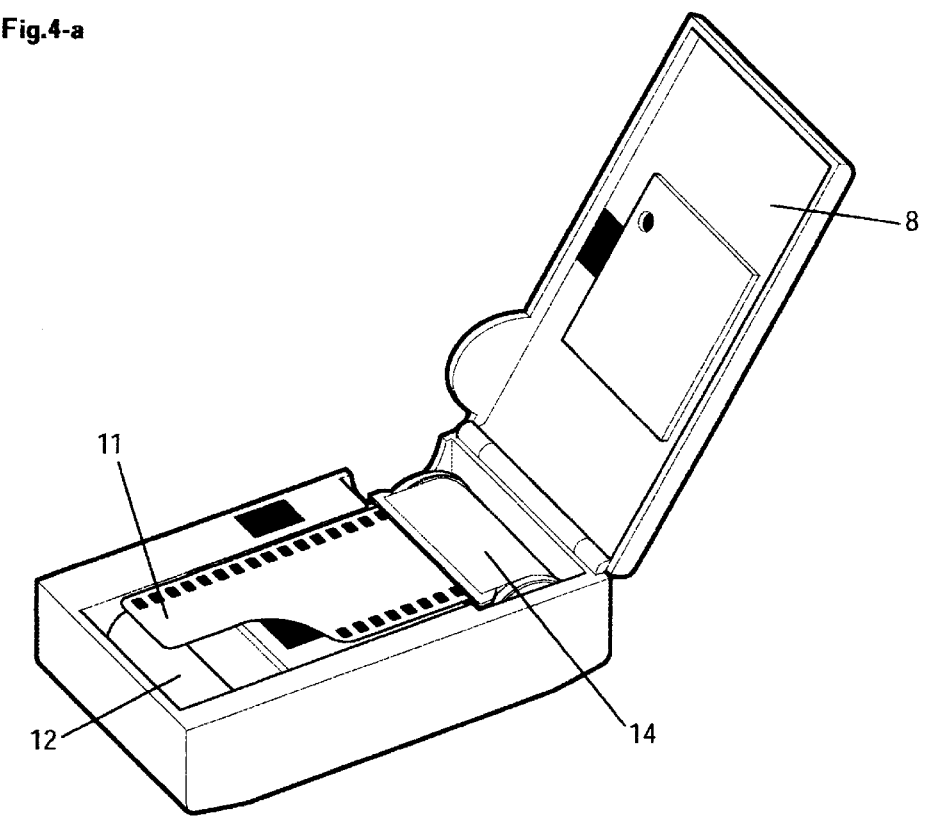
Fig.4-b
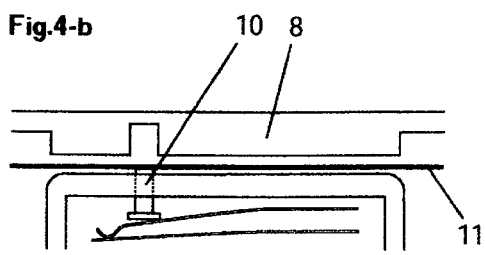
Fig.4-c
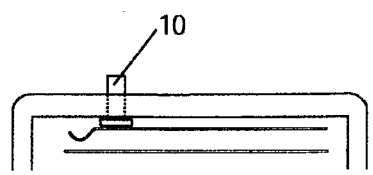

Fig.6-a
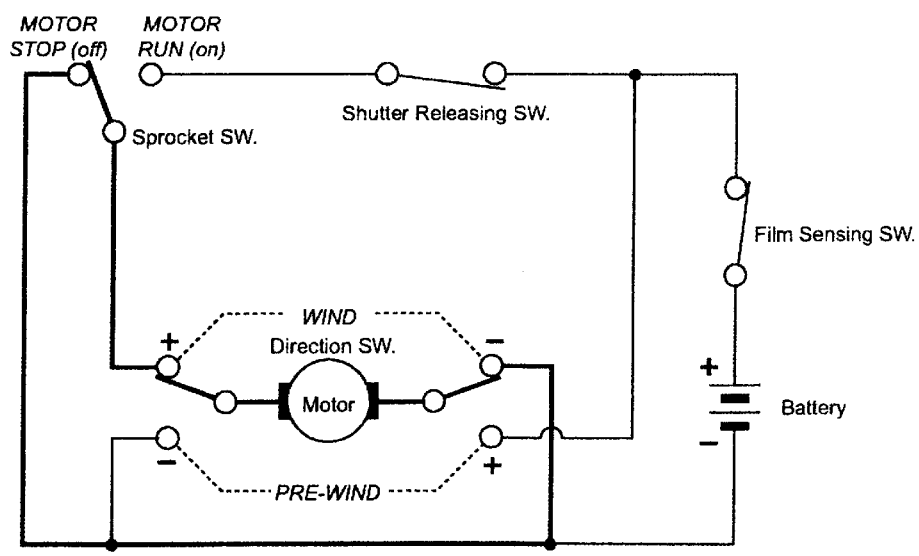
Fig.6-b
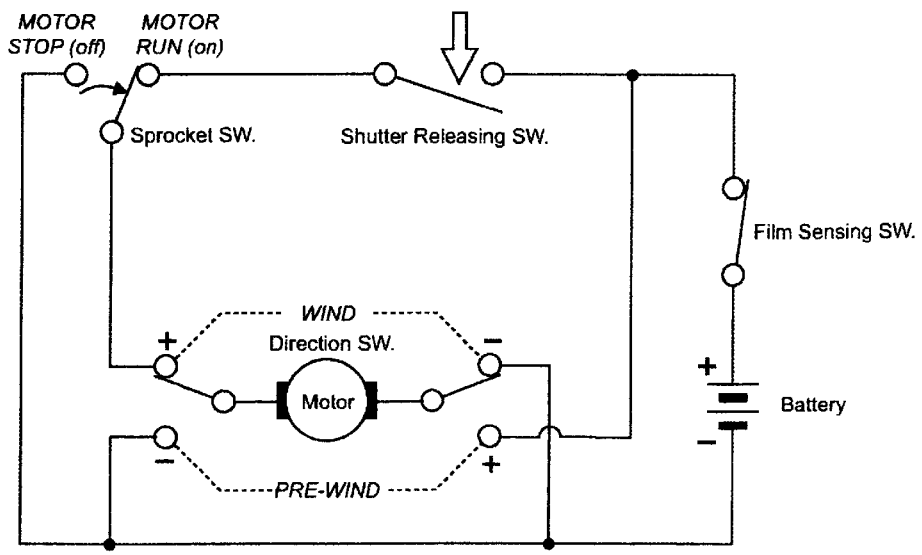

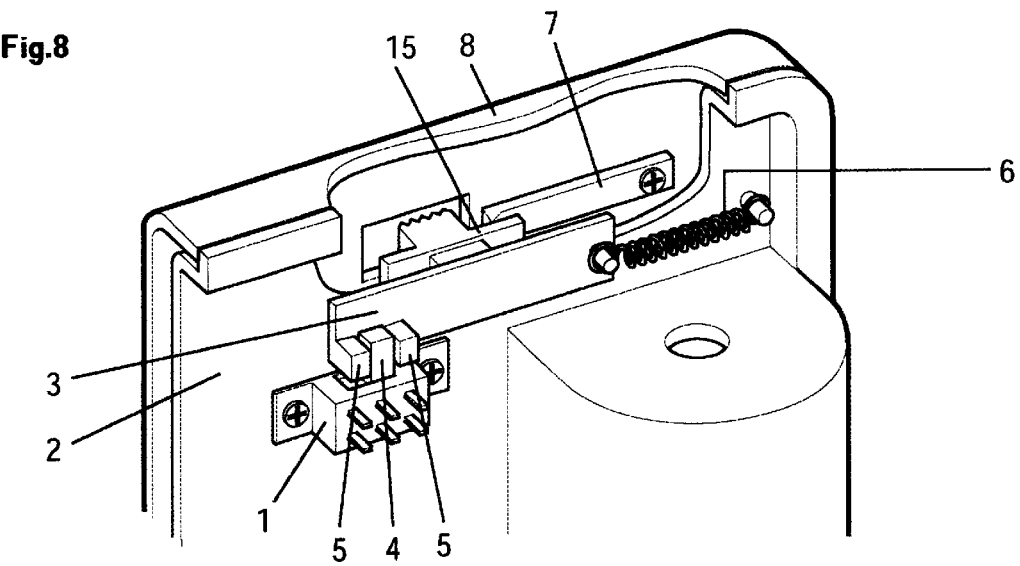
Fig.8
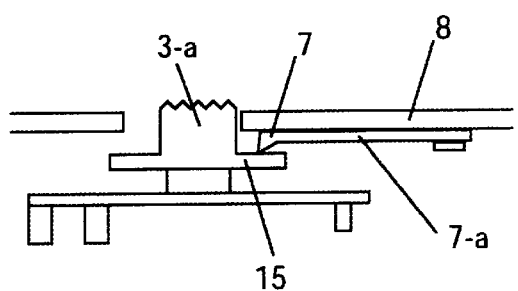
Fig.8-a
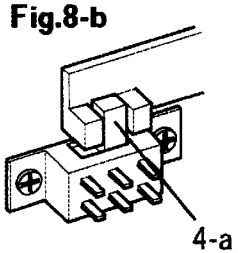
Fig.8-b
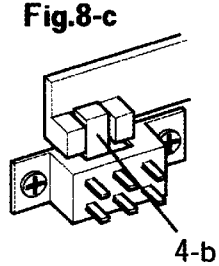
Fig.8-c

FILM PRE-WINDING MECHANISM FOR 35 MM FILM FORMAT STILL CAMERAS

BACKGROUND OF THE INVENTION

Film pre-winding for 35 mm format film cameras is a system with which a roll of unexposed 35 mm film can be fully wound up previously into the unexposed film chamber of the camera pulling the film out of the film cartridge before starting picture taking (giving exposures), and after each exposure the film is wound back into the film cartridge one frame by one frame, so that all the exposed frames are protected from being exposed twice by opening the camera back door accidentally.

In this type of film winding system, differently from the conventional type of film advancing, it is necessary to pull the unexposed film out of the film cartridge and to wind the unexposed film entirely over the take-up spool (or take-up drum) provided in the unexposed film chamber of the camera beforehand. Consequently the system to wind the unexposed film over the take-up spool must be added to the ordinary film winding mechanism. Inevitably the cost should be increased because of the additional mechanism and expensive electric parts for pre-winding control circuit. Due to this cost increase, today only some very expensive class 35 mm cameras use this pre-winding system for all this merit of pre-winding. In the world market today, such high end 35 mm compact cameras with the film pre-winding system like Fuji Super 145A, Super 120A, Super 90AZ compact 35 mm cameras which are all from Fuji Photo Film Co., Ltd. in Japan or such as Ricoh GR 1, GR 10, GR 21, R1 and R10 35 mm compact cameras, which are all from Ricoh Co., Ltd. in Japan are being sold. Other than the cameras mentioned above, there is practically none of the cameras with the film pre-winding system. Only a few cheap single use cameras have manual pre-winding mechanism, but to wind up a roll of unexposed film entirely over the take-up spool manually by hand it takes too much time and is not suitable for practical use. So all of the pre-winding system of the high end 35 mm cameras have motorized pre-winding system, and all of them control the film pre-winding and film winding back using a CPU (central processing unit-semiconductor).

However, such an electronically controlled pre-winding system is difficult to be provided in low cost. The manually controlled pre-winding mechanism by hand can be very low in cost, but users must pre-wind the film by handle or knob all the way to the end of film, which normally has maximum 36 exposures, and it cannot be suitable for practical use, unless the pre-winding is done by manufacturer using an automated pre-winding instrument in the factory before delivery just like the case of single use cameras.

If the film pre-winding can be done by motor, and if the film driving back and forth can be controlled mechanically using very inexpensive parts and a simple circuit instead of the expensive CPU controlled circuit and mechanism, such a film pre-winding mechanism can be fairly inexpensive in cost and quite suitable for practical use having the merit of the film pre-winding, namely protection of exposed film.

OBJECT OF THE INVENTION

It is, therefore, an object of the present invention to provide a film pre-winding mechanism of 35 mm film format cameras using mechanical control of film pre-winding over the take-up spool and film winding back into the film cartridge without using any expensive electronic circuit with CPU.

SUMMARY OF THE INVENTION

To achieve the above object, the film pre-winding mechanism according to the present invention comprises a mechanical direction switch located on the camera body to change the motor rotation from pre-winding direction to winding back direction or in a reverse way, an actuator of the said mechanical direction switch which is coupled with the knob of the direction switch and controls the position of the knob of the direction switch, a spring which pulls the said actuator to keep the knob of the direction switch always at the pre-winding position, a means of actuator control provided on a part of the camera back door, and a film-sensing switch, which is located on a part of body where the film is running and which is turned on to rotate the motor by the pressure of the camera back door and the loaded film when the camera back door is closed with the film placed over it.

According to the present invention, when the camera back door is opened, the actuator is pulled by the spring immediately, and the knob of the direction switch is set at the pre-winding position, and the actuator and the knob of the direction switch are held at pre-winding position even after the camera back door is closed again. So, to load an unexposed film, the camera back door must be opened, and the instant that the camera back door is opened, the actuator and the knob of the direction switch are set at the film pre-winding position, and after the camera back door is closed with the loaded film again, the direction switch is still at the pre-winding position being ready to pre-wind the loaded film if the motor starts running.

The film driving circuit is so designed as to start pre-winding film automatically when the camera back door is closed with film loaded in the camera. When the loaded film and the closed camera back door together depress the film-sensing switch, it is turned on and the motor starts running immediately. And the unexposed film is to be pre-wound over the take-up spool in the unexposed film chamber automatically. After the unexposed film has been entirely pre-wound over the take-up spool or take-up drum in the unexposed film chamber, as the next step for picture taking, the knob of the direction switch should be moved manually by hand to the winding position, and then the motor rotation is switched to winding direction, and an unexposed frame of the film is pulled back out of the unexposed film chamber and placed at the picture taking position automatically, and the film driving stops there. And after depressing the shutter release button once, another unexposed frame of the film will be advanced to the picture taking position advancing the exposed frame into the film cartridge. When the last frame of the unexposed film is exposed, all the exposed frames of the film will have been wound back into the film cartridge and safely protected there.

In the case of conventional 35 mm cameras, the unexposed film should be kept in the film cartridge, and be advanced one frame by one frame after each exposure to the exposed film chamber of the camera, and after the roll of film has been fully exposed, the film must be re-wound back into the film cartridge. So all the exposed frames are stored in the exposed film chamber once, which is not light tight, and not stored in the safe light tight film cartridge. Therefore all the exposed frames will be completely damaged, if the camera back door is opened accidentally. With the present invention, the unexposed film is entirely pre-wound first into the unexposed film chamber, and then the unexposed film is pulled out of the unexposed film chamber one frame by one frame after each exposure, and all the exposed frames are wound back into the film cartridge which is perfectly light tight, so all the exposed frames are protected from the damage of accidental back door opening. The present invention is related to this pre-winding mechanism of the unexposed film.

BRIEF DESCRIPTION OF THE DRAWINGS

FIG. 1-a is an exploded perspective rear view of the camera back door.

FIG. 1-b is an exploded perspective view of the motor direction switch assembly of FIG. 1 at the pre-winding position.

FIG. 1-c is another exploded perspective view of the motor direction switch assembly of FIG. 1 at the winding position.

FIG. 1-d is an illustration to show the relative positions of the actuator control claw and the claw of actuator of FIG. 1.

FIG. 2-a is an illustration to show the relative positions of the actuator control claw and the claw of actuator of FIG. 2.

FIG. 2-b is an exploded perspective view of the motor direction switch assembly of FIG. 2 at the winding position.

FIG. 2-c is another exploded perspective view of the motor direction switch assembly of FIG. 2 at the pre-winding position.

FIG. 3-a is an illustration to show the relative positions of the actuator control claw and the claw of actuator of FIG. 3.

FIG. 3-b is an exploded perspective view of the motor direction switch assembly of FIG. 3 at the pre-winding position.

FIG. 4-a is a perspective rear view of the camera with the pre-winding mechanism of FIG. 4 with the tip of the film placed over the take-up spool of the unexposed film chamber.

FIG. 4-b is an illustration to show the film-sensing switch being depressed by the loaded film and the camera back door (on position).

FIG. 4-c is an illustration to show the film-sensing switch without any pressure fom the loaded film and the camera back door (off position).

FIG. 6-a is a circuit schematic of the first and second embodiments of the present invention in the status of FIG. 2 and FIG. 9 after one exposed frame having been advanced to the film cartridge.

FIG. 6-b is an circuit schematic of the first and second embodiments of the present invention in the status of FIG. 2 and FIG. 9 with the shutter releasing switch is being depressed to give an exposure.

FIG. 8 is an exploded perspective view of the pre-winding mechanism of another preferred embodiment of the present invention in the status that a roll of unexposed film is being pre-wound.

FIG. 8-a is an illustration to show the relative positions of actuator control claw and the knob of the actuator.

FIG. 8-b is an exploded perspective view of the motor direction switch assembly of FIG. 8 at the pre-winding position.

FIG. 8-c is another exploded perspective view of the motor direction switch assembly of FIG. 8 at the winding position.

FIG. 9-a is an illustration to show the relative positions of actuator control claw and the knob of the actuator.

FIG. 9-b is an exploded perspective view of the motor direction switch assembly of FIG. 9 at the pre-winding position.

FIG. 9-c is another exploded perspective view of the motor direction switch assembly of FIG. 9 at the winding position.

FIG. 10-a is an illustration to show the relative positions of actuator control claw and the knob of the actuator.

FIG. 10-b is an exploded perspective view of the motor direction switch assembly of FIG. 10 at the pre-winding position.

NOTATIONS

Figure 1:
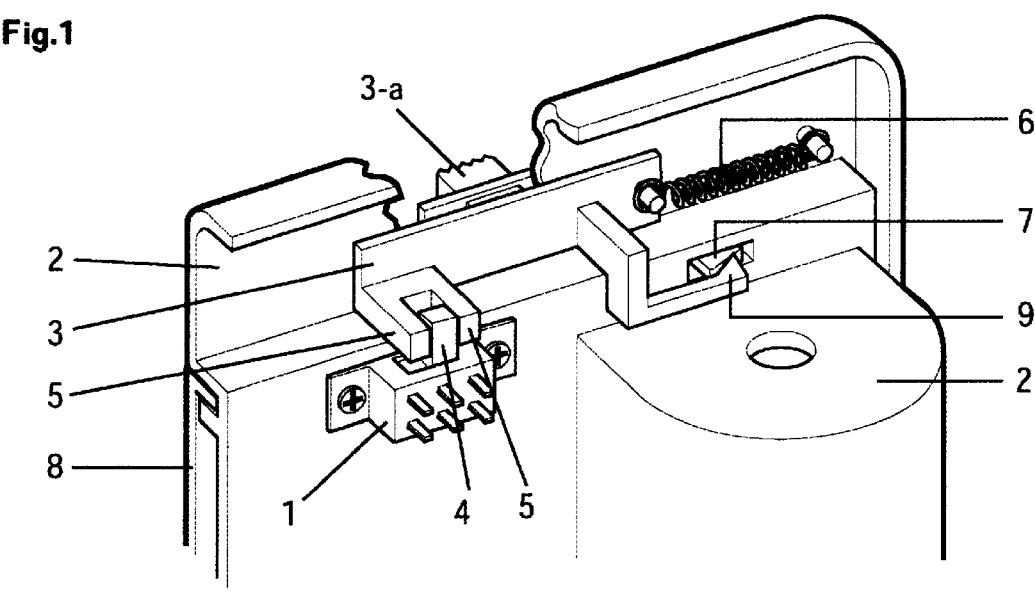
FIG. 1 is an exploded perspective view of the pre-winding mechanism of a preferred embodiment of the present invention in the status that a roll of unexposed film is being pre-wound.
Figure 1:
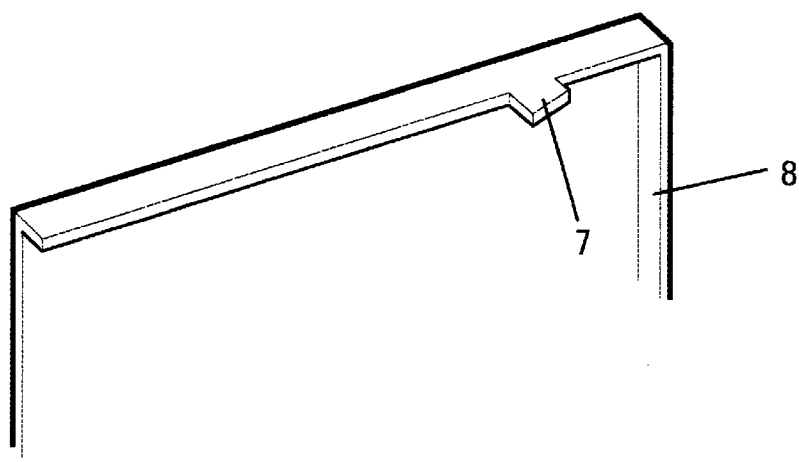
Figure 2:
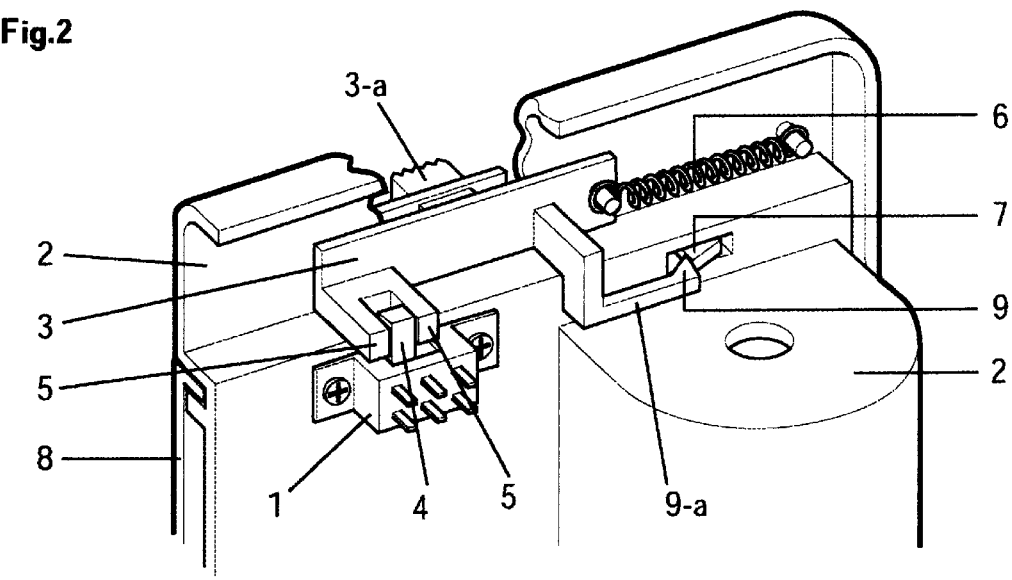
FIG. 2 is an exploded perspective view of the pre-winding mechanism of FIG. 1 in the status that the unexposed film having been pre-wound entirely and the camera is ready for picture taking.
Figure 2:
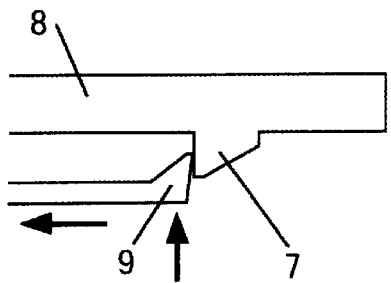
Figure 2:
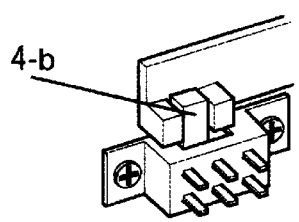
Figure 2:
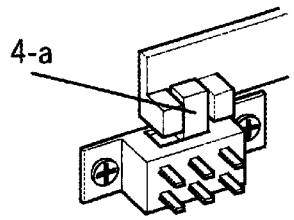
Figure 3:
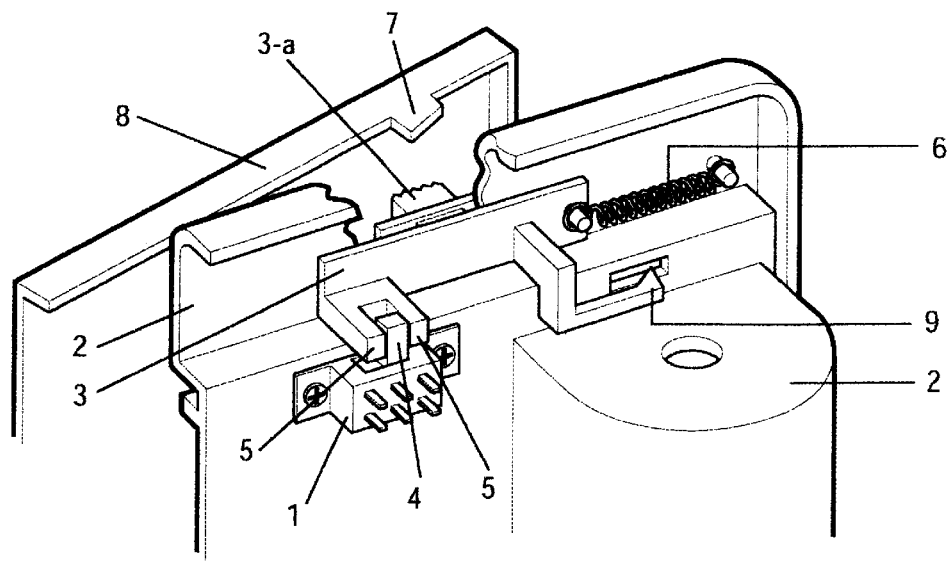
FIG. 3 is an exploded perspective view of the pre-winding mechanism of FIG. 1 in the status that the camera back door is opened, and the mechanism is ready for a new film to be loaded for pre-winding.
Figure 3:
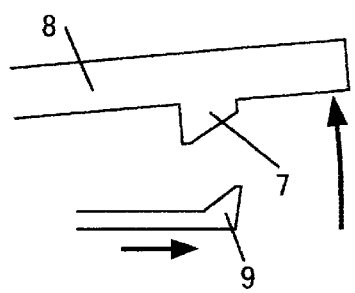
Figure 3:
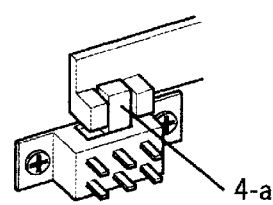
Figure 4:
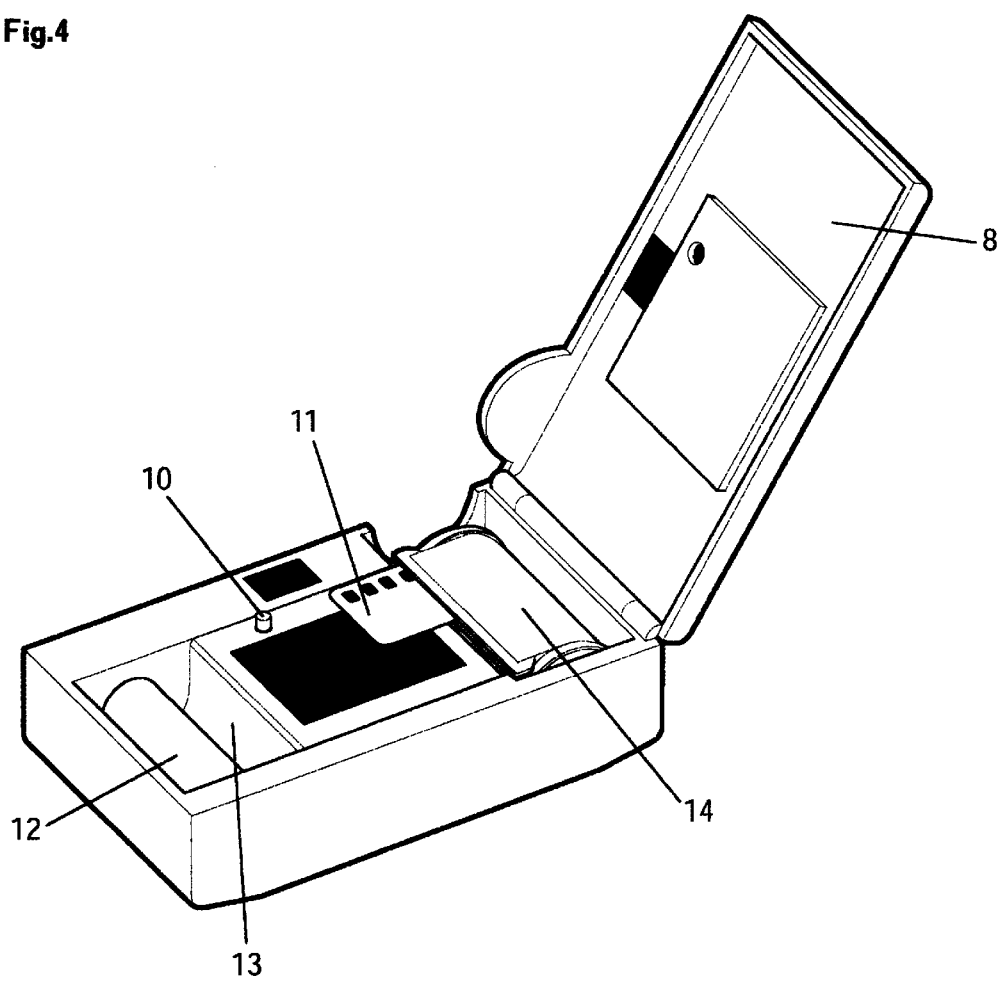
FIG. 4 is a perspective rear view of the camera with the pre-winding mechanism of the present invention, in which a film cartridge is placed in the cartridge chamber.
Figure 9:
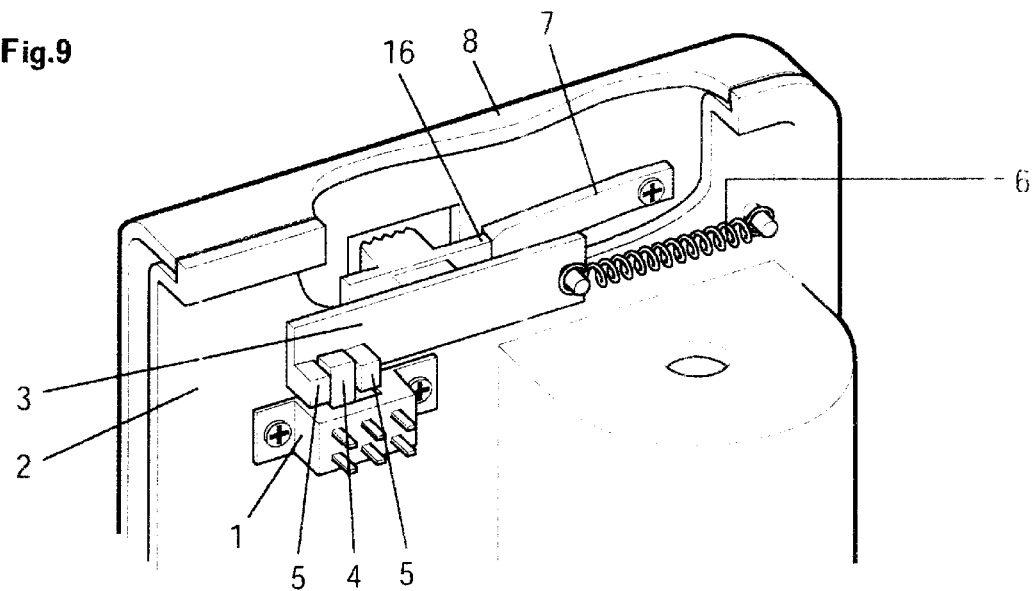
FIG. 9 is an exploded perspective view of the pre-winding mechanism of FIG. 8 in the status that the unexposed film having been pre-wound entirely and the camera is ready for picture taking.
Figure 9:
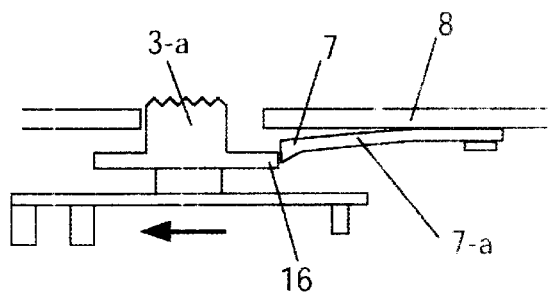
Figure 9:
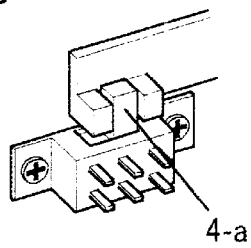
Figure 9:
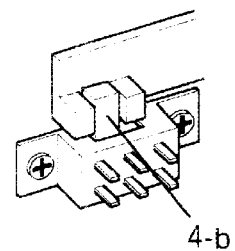
Figure 10:
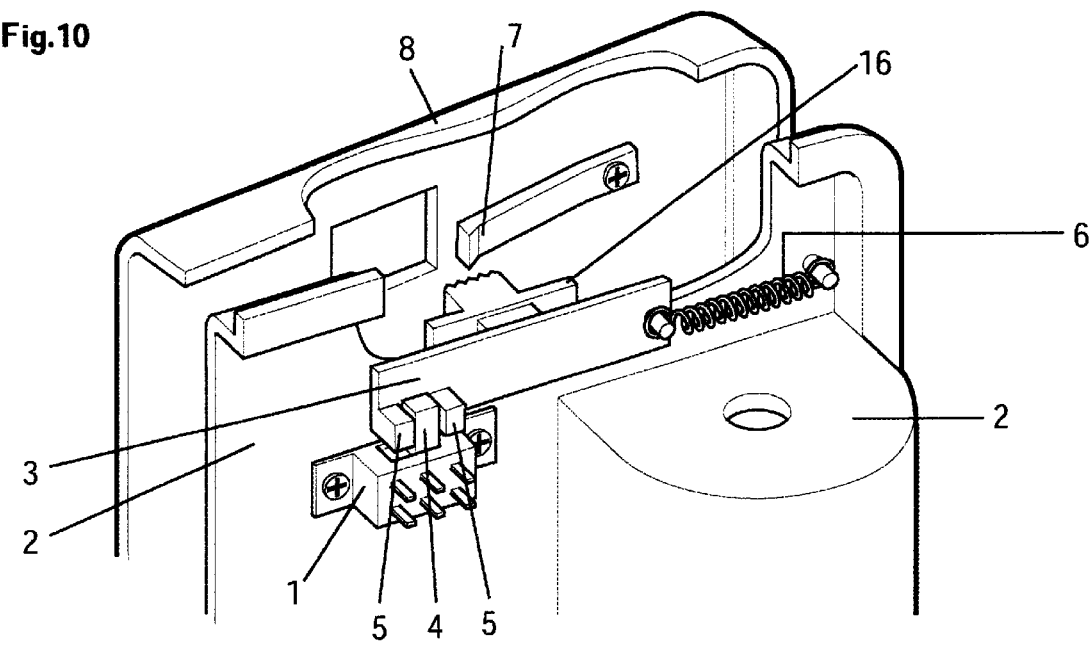
FIG. 10 is an exploded perspective view of the pre-winding mechanism of FIG. 8 in the status that the camera back door is opened, and the mechanism is ready for a new film to be loaded for pre-winding.
Figure 10:
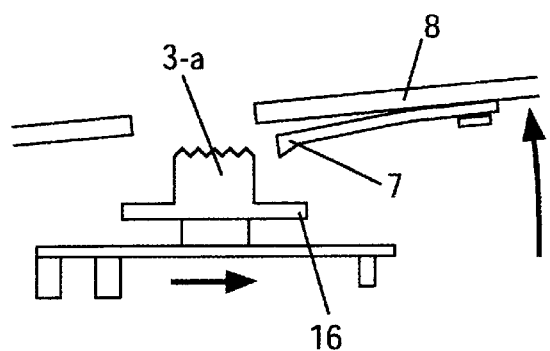
Figure 10:
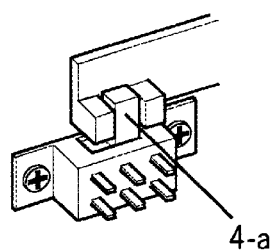

FIG. 1
1 direction switch
2 camera body
3 Actuator
3-a knob of actuator
4 knob of direction switch
5 arms
6 coil spring
7 actuator control claw
8 camera back door
9 claw of actuator
FIG. 1-a
7 actuator control claw
8 camera back door
FIG. 1-b
4-a film pre-winding position
FIG. 1-c
4-b film winding position
FIG. 1-d
7. actuator control claw
8. camera back door
9. claw of actuator FIG. 2
1 direction switch
2 camera body
3 actuator
3-a knob of actuator
4 knob of direction switch
5 arms
6 coil spring
7 actuator control claw
8 camera back door
9 claw of actuator
9-a arm of claw of actuator
FIG. 2-a
7 actuator control claw
8 camera back door
9 claw of actuator
FIG. 2-b
4-b film winding position
FIG. 2-c
4-a film pre-winding position
FIG. 3
1 direction switch
2 camera body
3 actuator
3-a knob of actuator
4 knob of direction switch
5 arms
6 coil spring
7 actuator control claw
8 camera back door
9 claw of actuator
FIG. 3-a
7 actuator control claw
8 camera back door
9 claw of actuator
FIG. 3-b
4-a film pre-winding position
FIG. 4
8 camera back door
10 film-sensing switch
11 tip of film
12 take up spool
13 unexposed film chamber
14 film cartridge
FIG. 4-a
8 camera back door
11 tip of film
12 take up spool
14 film cartridge
FIG. 4-b
8 camera back door
10 film-sensing switch
11 tip of film
FIG. 4-c
10 film-sensing switch
FIG. 8
1 direction switch
2 camera body
3 actuator
3-a knob of actuator
4 knob of direction switch
5 arms
6 coil spring
7 actuator control claw
8 camera back door
15 basal part of actuator knob FIG. 8-a
3-a knob of actuator
7 actuator control claw
7-a arm of actuator control claw
8 camera back door
15 basal part of actuator knob
FIG. 8-b
4-a film pre-winding position
FIG. 8-c
4-b film winding position
FIG. 9
1 direction switch
2 camera body
3 actuator
3-a knob of actuator
4 knob of direction switch
5 arms
6 coil spring
7 actuator control claw
8 camera back door
16 edge of basal part of actuator knob
FIG. 9-a
3-a knob of actuator
7 actuator control claw
7-a arm of actuator control claw
8 camera back door
16 edge of basal part of actuator knob
FIG. 9-b
4-a film pre-winding position
FIG. 9-c
4-b film winding position
FIG. 10
1 direction switch
2 camera body
3 actuator
3-a knob of actuator
4 knob of direction switch
5 arms
6 coil spring
7 actuator control claw
8 camera back door
16 edge of basal part of actuator knob
FIG. 10-a
3-a knob of actuator
6 actuator control claw
7 actuator control claw
8 camera back door
16 edge of basal part of actuator knob
FIG. 10-b
4-a film pre-winding position

DETAILED DESCRIPTION OF THE INVENTION

FIG. 1 shows a preferred embodiment of the present invention. The film pre-winding mechanism comprises a direction switch (1) fixed on the camera body (2) to change the direction of motor rotation, an actuator (3) of the direction switch (1) which is coupled with the knob (4) of the direction switch (1), a coil spring (6) to pull the direction switch (1) and the actuator (3) always in one direction, an actuator control claw (7) provided on the rim of the camera back door (8) as shown in FIG. 1-a, and a film-sensing switch (10 of FIG. 4), which is located on a part of body where the film is running, and which is turned on to rotate the motor by the pressure of the camera back door and the loaded film when the camera back door is closed with the film placed over the film-sensing switch.

The direction switch (1) changes the direction of motor rotation from film pre-winding rotation to film winding rotation or in a reverse way, and if the direction switch (1) is set at the film pre-winding position (4-a) as sown in FIG. 1-b, the film driving motor rotates in the direction to pre-wind the film into the unexposed film chamber of the camera pulling the unexposed film out of the film cartridge (14 of FIG. 4), and if it is set at the film winding position (4-b) as shown in FIG. 1-c, the motor rotates in the reverse direction to advance the exposed frames of film back into the film cartridge (14).

The actuator (3) is provided on the camera body (2) with the actuator knob (3-a), and two arms (5) shaped like a fork are provided on one end of the actuator (3), and between the said two arms the knob (4) of the direction switch (1) is inserted, and when the actuator (3) moves from side to side, the knob (4) of the direction switch (1) also moves along with the movement of the actuator (3).

The coil spring (6) always pulls the actuator (3) in the direction of pre-winding position (4-a) as shown in FIG. 1-b, so that the actuator (3) may move the knob (4) of the direction switch (1) to the pre-winding position (4-a) too, and keep it always there unless the actuator (3) and the knob (4) of the direction switch (1) are manually moved to and locked at the winding position (4-b) as shown in FIG. 1-c.

The actuator control claw (7) is provided on the rim of the camera back door (8) as shown in FIG. 1-a. Whenever the actuator (3) and the knob (4) of the direction switch (1) are set at the pre-winding position (4-a) as shown in FIG. 1, the actuator control claw (7) is in front of the claw (9) of the actuator (7) without touching the claw (9) of the actuator (3) as shown in FIG. 1-d, which is provided on the opposite end of the actuator (3) from the two arms (5) provided on the actuator (3), therefore regardless of the camera back door (8) being closed or opened and as long as the actuator (3) and the knob (4) of the direction switch (1) stay at the pre-winding position, the actuator control claw (7) of the camera back door (8) does not touch the claw (9) of the actuator (3), and the actuator (3) and the knob (4) of the direction switch (1) can be kept at the pre-winding position (4-a) unmoved.

When the actuator (3) and the knob (4) of the direction switch (1) are moved by hand with the actuator knob (3-a) manually to the winding position (4-b) as shown in FIG. 1-c after the camera back door (8) has been closed, the actuator control claw (7) keeps the actuator (3) and the knob (4) of the direction switch (1) at the winding position (4-b), blocking the claw (9) of the actuator (3), as shown in FIG. 2 & FIG. 2-a.

When the camera back door (8) is opened, the actuator control claw (7) releases the claw (9) of the actuator (3) to be free, so that the actuator (3) and direction switch (1) can move back to the pre-winding position (4-a) by the tension of the coil spring (6), as shown in FIG. 3 & FIG. 3-a.

FIG. 1 also shows the status of the film pre-winding mechanism that the actuator (3) and the knob (4) of the direction switch (1) are still kept at the pre-winding position (4-a) being pulled by the coil spring (6) even after the camera back door (8) has been closed, and that the film pre-winding is proceeding.

FIG. 2 shows the status of the film pre-winding mechanism that the back door (8) has been closed with the film loaded, and the actuator (3) and direction switch (1) have been moved by hand with the actuator knob (3-a) manually to the winding position (4-b) as shown in FIG. 2-b to advance unexposed frames of the film for picture taking, and the claw (9) of the actuator (3) also has been moved in the same direction. When the actuator (3) and the knob (4) of the direction switch (1) move from the pre-winding position (4-a) as shown in FIG. 2-c to the winding position (4-b), the claw (9) of the actuator (3) also moves running over the top of the actuator control claw (7) using elasticity of the arm (9-a) of the claw (9) of the actuator (3). And the actuator control claw (7) keeps the actuator (3) and the knob (4) of the direction switch (1) at the winding position (4-b), blocking the claw (9) of the actuator (3), as shown in FIG. 2-a.

In the status of FIG. 2, whenever the shutter of the camera is released, an unexposed frame of the film is exposed and then advanced, namely the exposed frame is advanced and wound back into the film cartridge (14 of FIG. 4), and another unexposed frame is advanced from the unexposed film chamber to the picture taking position. FIG. 2 shows the status of the film pre-winding mechanism that the shutter is ready to be released, but not released yet.

FIG. 3 shows the status of the film pre-winding mechanism that after the film has been entirely exposed, the camera back door (8) is opened again to take out the exposed film from the camera, and the actuator (3) and the knob (4) of the direction switch (1) are set back by the tension of the spring (6) at the pre-winding position (4-a) as shown in FIG. 3-b again.

In the status of FIG. 3, the claw (9) of the actuator (3) is not blocked by the actuator control claw (7) and free from the actuator control claw (7) as shown in FIG. 3-a, and by the tension of the coil spring (6) the actuator (3) and the knob (4) of the direction switch (1) have been pulled back to the pre-winding position (4-a) again as shown in FIG. 3-b. When the camera back door (8) is closed again with a roll of unexposed film loaded, the status of the film pre-winding mechanism returns to the status of FIG. 1.

FIG. 4 shows the locations of the film-sensing switch (10), the take up spool (12), the unexposed film chamber (13), and the film cartridge (14). As explained so far, whenever the camera back door (8) is opened, the knob (4) of the direction switch (1) is set at the pre-winding position (4-a) and ready to start the motor. As the next step an unexposed film is loaded, and the tip (11) of the film is placed over the take-up spool (12) of the unexposed film chamber (13) as shown in FIG. 4-a. And then the camera back door (8) is closed, and the instant that the unexposed film (11) and the camera back door (8) together depress the film-sensing switch (10) as shown in FIG. 4-b, the motor starts running to pre-wind the film into the unexposed film chamber (13) of the camera. FIG. 4-c shows the film-sensing switch being off without any pressure from the film and the camera back door (8).

Figure 5:
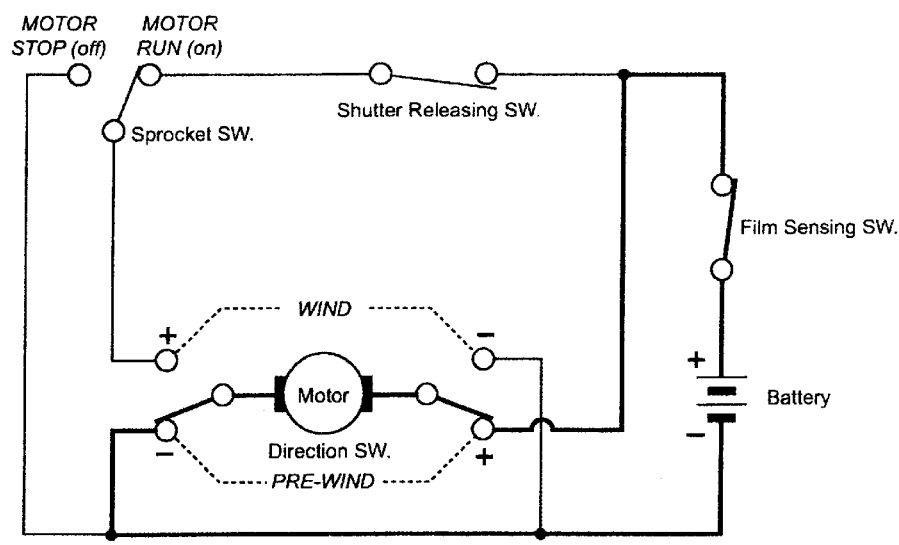
FIG. 5 is a circuit schematic of the first and second embodiments of the present invention in the status of FIG. 1 and FIG. 8.

FIG. 5 shows an example of the circuit schematic of the first embodiment of the present invention in the status of FIG. 1, in which the actuator (3) and the knob (4) of the direction switch (1) are set at the pre-winding position (4-a), and the unexposed film is being pre-wound into the unexposed film chamber with the film-sensing switch (10) turned on by the pressure given by the loaded film and the camera back door (8).

Figure 6:
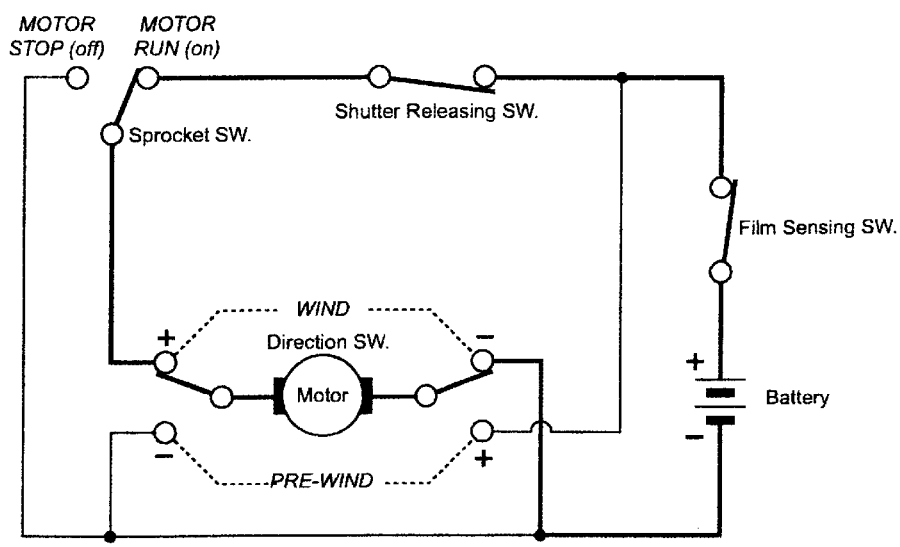
FIG. 6 is a circuit schematic of the first and second embodiments of the present invention in the status of FIG. 2 and FIG. 9 with the exposed frame being wound back into the film cartridge.

FIG. 6 shows another example circuit schematic of the first embodiment of the present invention in the status of FIG. 2, in which the actuator (3) and the knob (4) of the direction switch (1) are at the winding position (4-b) and the unexposed film is being pulled out of the unexposed film chamber and is being advanced to the picture taking position after an exposure (one shutter releasing), and the exposed film is being advanced to the film cartridge (14) with the film-sensing switch (10) turned on by the pressure given by the loaded film and the camera back door (8).

The sprocket switch as shown in FIG. 6 is provided to control the sprocket gear, which is provided on the camera body to counts the number of the film perforations mechanically and to stop the motor after one frame of the film has been advanced. When the film starts advancing to the film cartridge after an exposure given, the sprocket gear starts rotating mechanically engaging with and being driven by the running film perforations, and counts the number of the film perforations, and stops the rotation mechanically after one full frame of the exposed film has been advanced and wound back into the film cartridge, and the sprocket switch turns off mechanically. After the shutter has been once released, using the movement of the shutter releasing, the sprocket switch turns on again. So after the shutter is released once, the sprocket switch is on, and while the sprocket gear is rotating (or the film is being advanced into the film cartridge), the sprocket switch is always on, and when the sprocket gear stops rotating, the sprocket switch turns off mechanically and is off until the next shutter releasing is made.

When the shutter release button is depressed, the shutter-releasing switch as shown in FIG. 6 turns off. Using the movement of shutter release button, the shutter-releasing switch is operated mechanically, namely if the button is depressed, the shutter-releasing switch is off, and if the button is not depressed, the switch is on.

FIG. 6-a shows the third example circuit schematic of the first embodiment of the present invention in the status that after one exposed frame has been advanced into the film cartridge and the motor has stopped running, and the camera is ready for the next shutter releasing (picture taking).

FIG. 6-b shows the forth example circuit schematic of the first embodiment of the present invention in the status that the shutter release button is being depressed and the shutter release switch is off, and after an exposure has been given the shutter releasing action mechanically sets the sprocket switch back at the "on" position as shown by an arrow in FIG. 6-b.

Figure 7:
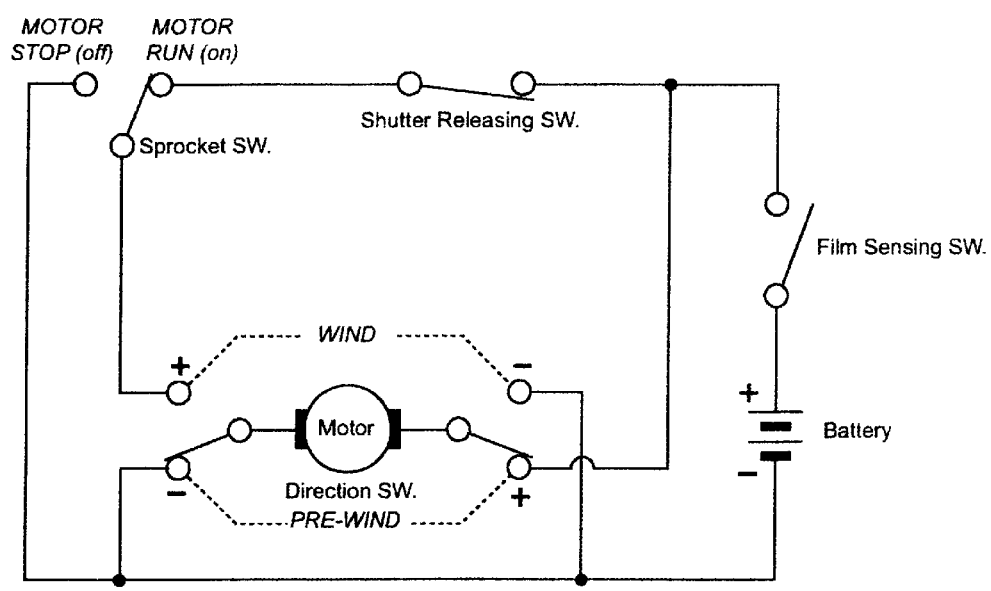
FIG. 7 is a circuit schematic of the first and second embodiments of the present invention in the status of FIG. 3 and FIG. 10.

FIG. 7 shows the fifth example of circuit schematic of the first embodiment of the present invention in the status of FIG. 3, in which the actuator (3) and the knob (4) of the direction switch (1) are at the pre-winding position (4-a), but the film-sensing switch (10) is off, because the unexposed film has been fully exposed and advanced and wound up back into the film cartridge (14), and there is no pressure at all to the film-sensing switch (10) or because the camera back door (8) is fully opened so that no pressure can be given to the film-sensing switch (10).

FIG. 8 shows another preferred embodiment of the present invention. The film pre-winding mechanism comprises a direction switch (1) fixed on the camera body (2) to change the direction of motor rotation, an actuator (3) of the direction switch (1) which is coupled with the knob (4) of the direction switch (1), a coil spring (6) to pull the direction switch (1) and the actuator (3) always in one direction, an actuator control claw (7) provided on the inside wall of the camera back door (8) as shown in FIG. 8-a, and a film-sensing switch (10 of FIG. 4), which is located on a part of body where the film is running and which is turned on to rotate the motor by the pressure of the camera back door and the loaded film when the camera back door is closed with the film placed over the film-sensing switch.

The direction switch (1) changes the direction of motor rotation from film pre-winding rotation to film winding rotation or in a reverse way, and if the knob (4) of the direction switch (1) is set at the film pre-winding position (4-a) as shown in FIG. 8-b, the film driving motor rotates in the direction to pre-wind the film into the unexposed film chamber of the camera pulling the unexposed film out of the film cartridge (14 of FIG. 4), and if it is set at the film winding position (4-b) as shown in FIG. 8-c, the motor rotates in the reverse direction to advance the exposed frames of film back into the film cartridge (14).

The actuator (3) is provided on the camera body (2) with the actuator knob (3-a), and two arms (5) shaped like a fork are provided on one end of the actuator (3), and between the said two arms the knob (4) of the direction switch (1) is inserted, and when the actuator (3) moves from side to side, the knob (4) of the direction switch also moves along with the movement of the actuator (3).

The coil spring (6) always pulls the actuator (3) in the direction of pre-winding position (4-a) as shown in FIG. 8-b, so that the actuator (3) may move the knob (4) of the direction switch (1) to the pre-winding position (4-a) too, and keep it always there unless the actuator (3) and the knob (4) of the direction switch (1) are manually moved to and locked at the winding position (4-b) as shown in FIG. 8-c.

The actuator control claw (7) is provided on the inside wall of the camera back door (8) as shown in FIG. 8-a. Whenever the actuator (3) and the knob (4) of the direction switch (1) are set at the pre-winding position (4-a) as shown in FIG. 8, the actuator control claw (7) stays on the basal part (15) of the actuator knob (3-a) as shown in FIG. 8-a and does not block the movement of the actuator (3) in the direction of the pre-winding position (4-a). Consequently, regardless of the camera back door (8) being closed or opened and as long as the actuator (3) and the knob (4) of the direction switch (19 stay at the pre-winding position, the actuator control claw (7) of the camera back door (8) does not block the actuator knob (3-a), and the actuator (3) and the knob (4) of the direction switch (1) can be kept at the pre-winding position (4-a) unmoved.

When the actuator (3) and the knob (4) of the direction switch (1) are moved by hand with the actuator knob (3-a) manually to the winding position (4-b) as shown in FIG. 8-c after the camera back door (8) has been closed, the actuator control claw (7) keeps the actuator (3) and the knob (4) of the direction switch (1) at the winding position (4-b), blocking the edge (16) of the basal part (15) of the actuator knob (3-a) as shown in FIG. 9 and FIG. 9-a.

When the camera back door (8) is opened, the actuator control claw (7) releases the edge (16) of the basal part (15) of the actuator knob (3-a) to be free, so that the actuator (3) and direction switch (1) can move back to the pre-winding position by the tension of the coil spring (6), as shown in FIG. 10 and FIG. 10-a.

FIG. 8 also shows the status of the film pre-winding mechanism of the second embodiment of the present invention that the actuator (3) and the knob (4) of the direction switch (1) are still kept at the pre-winding position (4-a) being pulled by the coil spring (6) even after the camera back door (8) has been closed, and that the film pre-winding is proceeding.

FIG. 9 shows the status of the film pre-winding mechanism of the second embodiment of the present invention that the actuator (3) and direction switch (1) have been moved by hand with the actuator knob (3-a) manually to the winding position (4-b) as shown in FIG. 9-c to advance unexposed frames of the film for picture taking. When the actuator (3) and the knob (4) of the direction switch (1) move from the pre-winding position (4-a) as shown in FIG. 9-b to the winding position (4-*b*), the edge (16) of the basal part (15) of the actuator knob (3-*a*) also moves in the same direction and slides out from the rear side of the actuator control claw (7), and then the actuator control claw (7) comes down by its own spring tension caused by the elasticity of its own arm (7-*a*) to block the edge (16) of the basal part (15) of the actuator knob (3-*a*) as shown in FIG. 9-*a*. Thus the actuator control claw comes down and blocks the edge (16) of the basal part (15) of the actuator knob (3-*a*) so that the actuator knob (3-*a*) and the direction switch (1) can stay at the winding position being blocked by the actuator claw (7). In the status of FIG. 9, whenever the shutter of the camera is released, an unexposed frame of the film is exposed and then advanced, namely the exposed frame is advanced and wound back into the film cartridge (14 of FIG. 4), and another unexposed frame is advanced from the unexposed film chamber to the picture taking position. FIG. 9 shows the status of the film pre-winding mechanism that the shutter is ready to be released, but not released yet.

FIG. 10 shows the status of the film pre-winding mechanism of the second embodiment of the present invention that after the film has been entirely exposed, the camera back door (8) is opened again to take out the exposed film from the camera, and the actuator (3) and the knob (4) of the direction switch (1) are set back by the tension of the spring (6) at the pre-winding position (4-*a*) again as shown in FIG. 10-*b*.

In the status of FIG. 10, the edge (16) of the basal part (15) of the actuator knob (3-*a*) is not blocked by the actuator control claw (7) and free from the actuator control claw (7) as shown in FIG. 10-*a*, and by the tension of the coil spring (6) the actuator (3) and the knob (4) of the direction switch (1) have been pulled back to the pre-winding position (4-*a*) again as shown in FIG. 10-*b*. When the camera back door (8) is closed again with a roll of unexposed film loaded, the status of the film pre-winding mechanism returns to the status of FIG. 8.

FIG. 4, FIG. 4-*a*, FIG. 4-*b* and FIG. 4-*c* can be referred to for the detailed description of the second embodiment of the present invention in the same way they are referred to for the detailed description of the first embodiment.

FIG. 5 also shows an example of the circuit schematic of the second embodiment of the present invention in the status of FIG. 8, in which the actuator (3) and the knob (4) of the direction switch (1) are set at the pre-winding position (4-*a*), and the unexposed film is being pre-wound into the unexposed film chamber with the film-sensing switch (10) turned on by the pressure given by the loaded film and the camera back door (8).

FIG. 6 also shows another example circuit schematic of the second embodiment of the present invention in the status of FIG. 9, in which the actuator (3) and the knob (4) of the direction switch (1) are at the winding position (4-*b*) and the unexposed film is being pulled out of the unexposed film chamber and is being advanced to the picture taking position after an exposure (one shutter releasing), and the exposed film is being advanced to the film cartridge (14) with the film-sensing switch (10) turned on by the pressure given by the loaded film and the camera back door (8).

The sprocket switch as shown in FIG. 6 is provided to control the sprocket gear, which is provided on the camera body to counts the number of the film perforations mechanically and to stop the motor after one frame of the film has been advanced. When the film starts advancing to the film cartridge after an exposure given, the sprocket gear starts rotating mechanically engaging with and being driven by the running film perforations, and counts the number of the film perforations, and stops the rotation mechanically after one full frame of the exposed film has been advanced and wound back into the film cartridge, and the sprocket switch turns off mechanically. After the shutter has been once released, using the movement of the shutter releasing, the sprocket switch turns on again. So after the shutter is released once, the sprocket switch is on, and while the sprocket gear is rotating (or the film is being advanced into the film cartridge), the sprocket switch is always on, and when the sprocket gear stops rotating, the sprocket switch turns off mechanically and is off until the next shutter releasing is made.

When the shutter release button is depressed, the shutter-releasing switch turns off. Using the movement of shutter release button, the shutter-releasing switch is operated mechanically, namely if the button is depressed, the shutter-releasing switch is off, and if the button is not depressed, the switch is on.

FIG. 6-*a* also shows the third example circuit schematic of the second embodiment of the present invention in the status that after one exposed frame has been advanced into the film cartridge and the motor has stopped running, and the camera is ready for the next shutter releasing (picture taking).

FIG. 6-*b* also shows the forth example circuit schematic of the second embodiment of the present invention in the status that the shutter release button is being depressed and the shutter release switch is off, and after an exposure has been given the shutter releasing action mechanically sets the sprocket switch back at the "on" position as shown by an arrow in FIG. 6-*b*.

FIG. 7 also shows the fifth example of circuit schematic of the second embodiment of the present invention in the status of FIG. 10, in which the actuator (3) and the knob (4) of the direction switch (1) are at the pre-winding position (4-*a*), but the film-sensing switch (10) is off, because the unexposed film has been fully exposed and advanced and wound up back into the film cartridge (14), and there is no pressure at all to the film-sensing switch (10) or because the camera back door (8) is fully opened so that no pressure can be given to the film-sensing switch (10).

What is claimed is:

1. A film pre-winding mechanism of 135 format film (35 mm film) cameras which starts pre-winding a roll of unexposed film to the unexposed film chamber provided in the camera by motor just after the camera back door is closed with the unexposed film loaded inside, and of which the pre-winding setting can be changed manually by hand to the winding setting (picture taking setting) for picture taking after the pre-winding has been entirely completed, and which can be reset to the pre-winding setting of the mechanism automatically when the camera back door is opened again after the film has been exposed, wound back into and stored in the film cartridge comprising:

(a) a switch which changes the direction of motor rotation;

(b) an actuator which is provided with the said switch and changes the switch position along with its own movement;

(c) a spring which gives spring tension to the actuator so that the actuator is pulled always toward the pre-winding position of the switch and actuator;

(d) a means of actuator control which is provided on the back door of the camera and controls the actuator to lock the switch and actuator at the winding position when the camera is taking pictures, and to get the switch and actuator to return to the pre-winding position when the camera back door is opened and (e) a sensing switch of film loading, which is provided inside the camera body at a place where the switch can be depressed by the loaded film and the closed camera back door, and turns on to get the motor to run sensing the pressure of the loaded film and the closed camera back door.

* * * * *